Sept. 29, 1970  R. J. BROMELL ET AL  3,530,669
FLUID CONTROL SYSTEM
Filed Dec. 9, 1968
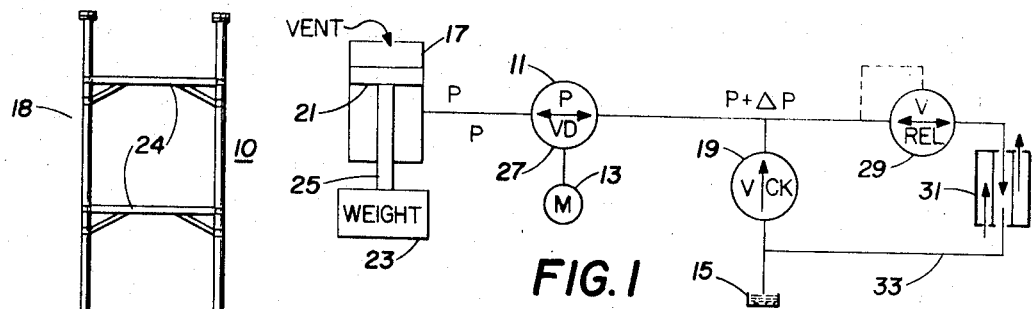
FIG. 1
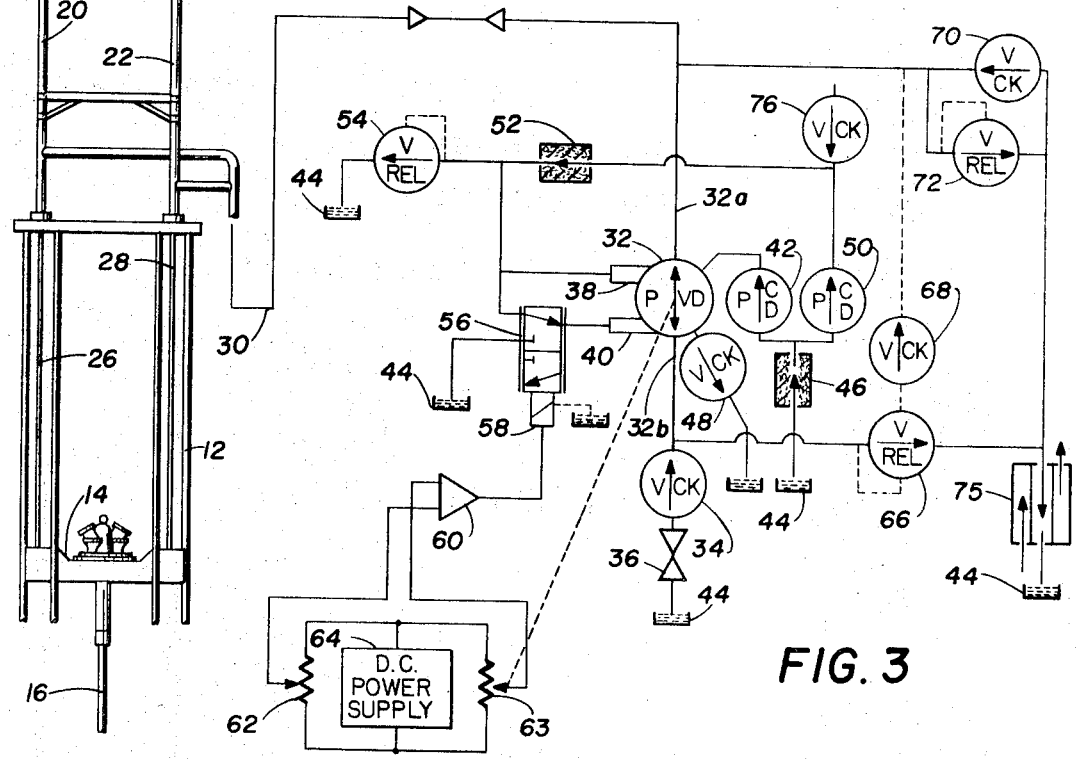
FIG. 3
FIG. 2
INVENTORS:
RAYMOND J. BROMELL
GEORGE HOMANICK
MARION D. LACKEY
Richards, Harris & Hubbard
ATTORNEY

United States Patent Office 3,530,669
Patented Sept. 29, 1970

3,530,669
FLUID CONTROL SYSTEM
Raymond J. Bromell, Dallas, Tex., George Homanick, Livonia, Mich., and Marion D. Lackey, Dallas, Tex., assignors to Automatic Drilling Machines, Inc., Dallas, Tex., a corporation of Texas
Filed Dec. 9, 1968, Ser. No. 782,231
Int. Cl. F15b 15/18
U.S. Cl. 60—52                                    15 Claims

ABSTRACT OF THE DISCLOSURE

A fluid control system that includes a variable displacement pump for varying the rate of fluid flow to and from a hydraulic operator. When pumping fluid to the operator, the pump operates in the usual manner converting mechanical energy into hydraulic pressure. During that part of a cycle when fluid is discharged from the hydraulic operator, an energy converter establishes a pressure downstream of the pump which exceeds the upstream pressure. Under such conditions, the variable displacement pump always operates to convert mechanical energy into fluid pressure. Where the load on the hydraulic operator varies, the downstream pressure during the discharge cycle varies in accordance with the load. The amount of fluid passing through the variable displacement pump in either direction is controlled by an electrically operated servo valve which directs fluid to or from the stroking cylinder, thereby controlling the pump yoke position.

BACKGROUND OF THE INVENTION

This invention relates to a fluid control system, and more particularly to a fluid control system for delivering a variable rate of fluid flow to and from a hydraulic operator under controlled energy conditions.

In many hydraulic control applications, it is desirable, and sometimes necessary, to control the flow of fluid to and from a power operator. In addition to merely varying the rate of fluid flow, it may be necessary to control the pressure differential across a pump when delivering fluid from a power operator. Heretofore, variable displacement pumps have been successfully employed to control the rate of flow to an operating device. Delivering fluid from the operator under controlled conditions was a difficult operation.

In accordance with the present invention, a variable displacement pump delivers fluid to and from a power operator under controlled flow conditions. When delivering fluid from the power operator, an energy converter is coupled to the pump to insure that the pump operates as such and not as a motor.

In accordance with a specific embodiment of this invention, a variable displacement pump, having a piston positionable yoke, controls the flow of fluid to and from a power operator. An electrically operated servo valve controls the flow of fluid to the piston positioner, thereby controlling the displacement of the pump. A relief valve is connected to one end of the pump and when delivering fluid from the power operator establishes a pressure downstream of the pump that exceeds the upstream pump pressure. The relief valve setting is controlled by a check valve which varies the downstream pressure in accordance with the upstream pressure to maintain a predetermined pressure differential across the pump under variable load conditions.

In the field of well drilling, one of the most energy consuming operations is that of lowering the drill string. To carry out this operation, the drill string may be attached to a drillhead which is raised and lowered hydraulically. In accordance with the present invention, hydraulic fluid for controlling the ascending and descending speeds of the drillhead is supplied by means of a variable displacement pump. This pump has a piston positionable yoke controlled by means of an electrically operated servo valve. The servo valve receives an error signal proportional to the difference between a desired yoke position and a feedback signal proportional to the actual yoke position. While lowering the drill string, an energy converter is connected in series with the pump and maintains a pressure on the reservoir side that exceeds the pressure established by the drill strip weight on the drillhead side of the pump. This insures that the pump always operates as such and thereby controls the flow of fluid from the drillhead.

An object of the present invention is to provide a fluid system for controlling the rate of flow to and from a hydraulic operator. A further object of this invention is to provide a fluid system for pumping fluid to and from a hydraulic operator under controlled conditions. A still further object of this invention is to provide a fluid system wherein the pressure differential across a variable displacement pump is maintained in accordance with the load on a power operator. An additional object of this invention is to provide a fluid system for controlling the ascending and descending speeds of a drillhead. Still another object of this invention is to provide a fluid system for controlling the ascending and descending speeds of a drillhead under control of a variable displacement pump.

SUMMARY OF THE INVENTION

This invention may be generally described as a fluid system for controlling the flow of fluid to and from a hydraulic operator wherein the system includes means for delivering fluid to and from the operator at varying flow rates. A system for establishing the rate of flow of fluid to and from the operator is connected to the delivery means. During delivery of fluid from the operator, an energy converter in series with the delivery means insures that fluid will be withdrawn from the hydraulic operator under controlled conditions.

A more complete understanding of the invention and its advantages will be apparent from the specification and claims and from the accompanying drawings illustrative of the invention.

BRIEF DESCRIPTION OF THE DRAWINGS

FIG. 1 is a schematic of a simplified hydraulic system for pumping fluid from a power operator connected to a fixed load;

FIG. 2 is a schematic of a simplified hydraulic system for pumping fluid from a power operator connected to a variable load; and FIG. 3 schematically illustrates a variable displacement pump fluid system for delivering fluid to and from hydraulic operators controlling the movement of a drillhead.

DESCRIPTION OF THE PREFERRED EMBODIMENTS

Referring to FIG. 1, a motor 13 drives a variable displacement pump 11 in series with a check valve 19 to pump hydraulic fluid from a reservoir 15 to a hydraulic operator 17. The power operator 17 includes a piston 21 coupled to a weight 23 (a fixed load) through a piston rod 25. In the usual manner, the rate of fluid flow through the variable displacement pump 11 is controlled by the position of a yoke 27. Since the rate of fluid flow through the pump 11 establishes the speed of lifting the weight 23, the yoke 27 provides the means for establishing a desired lifting speed. The pressure established in the operator 17 by the pump 11 is that required to lift the weight 23.

In accordance with the present invention, the flow of fluid from the power operator 17 may also be controlled by the position of the yoke 27. While pumping fluid from the reservoir 15 to the operator 17, the pump 27 delivers fluid from a low pressure condition to a high pressure condition. When withdrawing fluid from the operator 17, for the pump 11 to operate as such, it must again deliver fluid from a low pressure to a higher pressure. To establish a higher pressure downstream of the pump during delivery of fluid from the operator 17, a relief valve 29 is connected to the pump and the reservoir 15.

In operation, when lifting the weight 23, the motor 13 must supply energy as given by the equation:

$$E = (P_o - P_r)Q \qquad (1)$$

where:

$P_o$ is the pressure at the operator side of the pump 11, $P_r$ is the pressure at the reservoir side of the pump, and $Q$ is the flow rate of fluid through the pump as established by the position of the yoke 27.

If the reservoir pressure, $P_r$ is zero and a pressure $P$ is required to lift the weight 23, then the energy delivered by the motor 13 to the pump 11 to lift the weight may be written as:

$$E_u = PQ \qquad (2)$$

If the relief valve 29 is set to establish a pressure $P + \Delta P$ on the reservoir side of the pump 11, then from Equation 1 the energy required from the motor 13 when lowering the weight 23 will be given by:

$$E_D = [(P + \Delta P) - P]Q \qquad (3)$$

or $$E_D = \Delta PQ$$

Thus, when lifting the weight 23 and when lowering the weight the motor 13 must deliver energy to the pump 11. This means the pump 11 always controls the flow of fluid in the system.

Equation 1 may also be used to calculate the amount of energy dissipated at the relief valve 29 when lowering the weight 23. The energy equation for the relief valve 29 can be written as:

$$E_R = [(P + \Delta P) - P_r]Q \qquad (4)$$

If $P_r$ is zero, then the energy dissipated at the relief valve 29 may be written as:

$$E_R = (P + \Delta P)Q \qquad (5)$$

This energy is converted to heat by the relief valve; this heat is carried away by the passing fluid. To cool the heated fluid before returning to the reservoir 15, a heat exchanger 31 connects to the relief valve 29 and to the reservoir 15.

If the weight coupled to the hydraulic operator varies (a variable load), then the pressure at the operator side of the pump also varies and the relief valve pressure must be controlled accordingly. Referring to FIG. 2, where the same reference numerals are used for like elements, there is shown a modification of the system of FIG. 1 where the vent port of the relief valve 29 connects to a line 35 between the pump 11 and the hydraulic operator 17. Again, the mechanical energy produced by the motor 13 is converted into hydraulic pressure to lift a variable weight 37 (a variable load). The pressure produced by the pump 11 in the line 35 now varies as a function of the load. Likewise, the pressure established in the line 35 when lowering the weight 37 will vary in accordance with the load on the hydraulic operator 17.

If the relief valve 29 is set to establish a pressure of $$(P_{max} + \Delta P) \qquad (6)$$

where $P_{max}$ represents the maximum pressure established in the line 35 by the weight 37 to insure that the downstream pressure from the pump 11 always exceeds the upstream pressure, then for a minimum load on the operator 17, the energy dissipated by the relief valve in the system of FIG. 1 will be given by the equation:

$$E_R = [(P_{max} + \Delta P) - P_r]Q \qquad (7)$$

From this equation, it can be shown that a considerable excess of energy will have to be converted by the relief valve 29 when lowering a light load.

By connecting the vent port of the relief valve 29 to the operator side of the pump 11, as shown in FIG. 2, the pressure established by this valve will have a fixed relationship to the pressure in line 35. This pressure may be written as $(P_{35} + \Delta P)$, where $P_{35}$ represents a pressure in the line 35 as established by the weight 37. The differential pressure $(\Delta P)$ is established by a characteristic of the pilot operated relief valve 29 wherein the main spool pressure is at a somewhat higher pressure than the pressure in the pilot section. Thus, by connecting the pilot section to the line 35, the pressure at the relief valve side of the pump 11 is always higher than the inlet pressure by a fixed amount even while lowering a light load. The energy converted by the relief valve 29 will vary with the load as given by the equation:

$$E_R = [P_{35} + \Delta P) - P_R]Q$$
$$E_R = (P_{35} + \Delta P)Q \qquad (8)$$

if $P_r$ is zero.

Since the pump 11 may require a fixed differential between the inlet and outlet ports in excess of that established by the operation of the relief valve 29 for proper operation, a check valve 39 is included in the system between the vent port of the valve 29 and the line 35.

As explained previously, the energy dissipated by the relief valve 29 is converted into heat which is carried away by fluid in the line 33. A heat exchanger 31 is included in the line 33 of the system of FIG. 2 to carry this heat away from the system.

Thus, with the systems of FIGS. 1 and 2, the rate of flow of fluid to and from the hydraulic operator 17 is determined by the position of the yoke 27 of the pump 11. Since the rate of fluid flow through the pump 11 determines the speed of raising or lowering the weight connected to the hydraulic operator 17, complete speed control is obtainable with the systems described. Further, by stroking the yoke 27 to a center position, the weight connected to the operator 17 may be stopped at any desired position.

Referring now to FIG. 3, there is shown an application of the present invention to a drilling rig. The drilling rig 10 includes a mast 12 within which is slidably carried a vertically movable drillhead assembly 14. Drillhead assembly 14 threadably engages and supports a drill string 16, only a portion of which has been illustrated. Movement of the drillhead 14 relative to the mast 12 is accomplished by a suitably braced tower 18 fixed to the top of the mast 12. Tower 18 includes cylinders 20 and 22 which are suitably braced by struts 24. Rods 26 and 28, which are suitably mounted to pistons within the cylinders 20 and 22, respectively, are affixed to the drillhead 14 at their lower end and serve to effect vertical movement of the drillhead upon introduction of hydraulic fluid into the cylinders 20 and 22 through a line 30.

Fluid flow rates within the line 30 are controlled by a hydraulic system including a variable displacement pump 32, having an output port 32a for receiving the line 30. Fluid delivered by the pump 32 to the cylinders 20 and 22 is provided from a reservoir 44 through a check valve 34 and a shut off valve 36. The pump 32 may be any one of many commercially available pumps. Typically, the pump 32 may be a bent-axis, yoke-type, variable displacement pump. In such pumps, a cylinder block is mounted in a yoke which can be positioned at various angles. Pump output is established by the yoke position relative to the drive axis shaft. No flow is produced when the cylinder block center line is parallel to the drive shaft center line. The relative displacement of the pump yoke and cylinder block may be established by hydraulic fluid applied to a holding cylinder 38 and a stroking cylinder 40. Cylinder 40 has a piston area equal to two times that of the holding cylinder 38. Thus, only half the pressure need be maintained in the cylinder 40 to hold the yoke in a fixed position.

Since relatively large amounts of energy may be dissipated by the variable displacement pump 32, cooling oil is pumped through the jacket of pump 32 by means of a constant displacement pump 42. The pump 42 couples to an oil reservoir 44 through a filter 46 and pumps oil through the jacket of the pump 32 to the reservoir 44 through a check valve 48. The check valve 48 serves to establish a small back pressure in the pump jacket, thereby maintaining the jacket full of oil at all times.

To control the position of the yoke of the variable displacement pump 32, a constant displacement pump 50 delivers oil from the reservoir 44 through the filter 46 directly to the holding cylinder 38 through a filter 52. The pressure on the cylinder 38 is established by the setting of a relief valve 54 having a bleed line coupled to the reservoir 44. This same pressure is coupled to one port of a servo valve 56, having a second port connected to the stroking cylinder 40, and a third port for directing fluid to the reservoir 44.

The servo valve 56 operates in the usual manner by means of a torque motor 58 coupled to the spool of the valve 56. The torque motor 58 is energized by the output signal of a differential amplifier 60. Amplifier 60 receives a feedback signal from a potentiometer 63 coupled to the yoke of pump 32 as one input, and a controllable signal as a second input. The controllable signal is established by a potentiometer 62 in parallel with a voltage supply 64.

To control the flow rate of fluid through the pump 32, the potentiometer 62 is adjusted to energize the torque motor 58 to position the servo valve 56. The position of the spool of the valve 56 determines whether oil will be pumped to the stroking cylinder 40 or allowed to be drained from the cylinder 40. When oil is delivered to the cylinder 40, the yoke of the variable displacement pump 32 swings up and the amount of fluid delivered through the line 30 increases. Draining oil from the cylinder 40 through the valve 56 causes the yoke to swing down, decreasing the flow rate delivered by the variable displacement pump 32.

Variable displacement pumps have the ability of delivering oil to a power operator and controlling the flow from the operator. When the yoke of the variable displacement pump 32 swings below center, hydraulic fluid will be withdrawn from the cylinders 20 and 22 in a controlled manner as described with respect to FIGS. 1 and 2. An important feature of the present invention is a system for controlling the downstream pressure from the pump 32 during the reverse flow cycle. The pressure control system includes a relief valve 66 coupled to the port 32b of the pump 32 and to the reservoir 44. The pressure setting of the relief valve 66 is established by a check valve 68 coupled to a vent port of the valve 66 and to the output port 32a of the variable displacement pump 32. This is similar to the system of FIG. 2.

Fluid pumped from the cylinders 20 and 22 by the pump 32 cannot flow through the check valve 34 and is directed to the reservoir 44 through the relief valve 66. When the pressure differential between the relief valve 66 and the port 32a of the pump 32 exceeds the setting of the check valve 68, the relief valve 66 vents, thereby maintaining a preset pressure differential across the variable displacement pump 32. The combination of the relief valve 66 and the check valve 68 acts as a counterbalance valve to offset the effects of gravity working on the drillhead 14 and the drill string 16 to force fluid from the cylinders 20 and 22 during a downward motion. By offsetting the effects of gravity with the relief valve 66 and the check valve 68, the amount of fluid passing through the pump 32 can be effectively controlled by varying the displacement of the yoke.

To prevent the variable displacement pump 32 from running dry during the reverse flow cycle, a check valve 70 is connected to the pressure side of the pump at the port 32a and to the reservoir 44. Thus, if all the hydraulic fluid has been removed from the cylinders 20 and 22, the check valve 70 will open and fluid will be delivered from the reservoir 44 to maintain the pump 32 full of fluid at all times. When the pump 32 operates in a forward flow manner, a main relief valve 72, connected to the pressure side of the pump 32 at the port 32a, controls the maximum output pressure of the fluid.

To prepare the system shown in FIG. 3 for operation, hydraulic fluid is pumped through a check valve 76 and through the filter 52 into the cylinders 38 and 40. During this start-up procedure, the valve 56 will be set such that the yoke of the pump 32 will be at its center position and consequently no pumping action will take place.

In operation of the complete system shown in FIG. 3, to raise the drillhead 14 and the drill string 16, hydraulic fluid is pumped into the cylinders 20 and 22 through the line 30 by means of the variable displacement pump 32. The speed with which the drillhead 14 will be raised is determined by the amount of fluid available to the cylinders 20 and 22. An adjustment of the potentiometer 62 controls the amount of fluid available to the cylinders 20 and 22 by energizing the torque motor 58 to move the spool of the servo valve 56. Movement of the valve spool either increases or decreases the amount of fluid delivered to the cylinder 40 by means of the pump 50. As more fluid becomes available to the cylinder 40, the yoke of the variable displacement pump 32 will be displaced off-center in a direction to increase the amount of fluid pumped to the cylinders 20 and 22. The drillhead 14 and the drill string 16 are thus raised at a speed determined by the setting of the potentiometer 62.

In the reverse flow cycle, the drillhead 14 along with the drill string 16 are to be lowered. Again, the potentiometer 62 will be adjusted to cause the motor 58 to position the spool of the valve 56 in a manner to permit removal of fluid from the cylinder 40. Extracting fluid from the cylinder 40 causes the yoke of the variable displacement pump 32 to be displaced below center and hydraulic fluid will be pumped from the cylinders 20 and 22 at a controlled rate. The rate being determined by the amount of displacement of the pump yoke below a center position. The yoke displacement in turn is controlled by the setting of the potentiometer 62. Hydraulic fluid passing through the pump 32 in a reverse direction is directed through the relief valve 66 for return to the reservoir 44. When the pressure downstream of the pump 32 exceeds the setting of the relief valve 66 as established by the check valve 68, the relief valve opens to maintain a downstream pressure in excess of the upstream pressure and a preset differential across the pump.

Earlier systems for lowering a drill string into a drill hole required either a large band-brake, a kinetic hydraulic brake, or an eddy-current brake to absorb the energy dissipated in lowering the drill string under controlled conditions. With the present invention, the variable displacement pump 32, in conjunction with the relief valve 66 and the check valve 68, provide for controlled lowering of the drill string 16. The energy dissipated in the system illustrated in FIG. 3 will be evidenced as heat at the relief valve 66 which may be carried away by a heat exchanger 75. Previous systems did not have infinite speed control, and, except for the mechanical brakes, they could not completely stop a load. In accordance with the present invention, the speed of descent may be controlled by means of the potentiometer 62 operating to position the piston of the stroking cylinder 40. To stop the lowering operation at any particular point merely requires locating the yoke of the pump 32 to its center position. This stops the reverse flow pumping of the hydraulic fluid from the cylinders 20 and 22 and the drillhead 14 is held in a fixed position.

While several embodiments of the invention, together with modifications thereof, have been described in detail herein and shown in the accompanying drawings, it will be evident that various further modifications are possible in the arrangement and construction of its components without departing from the scope of the invention.

What is claimed is:

1. A system for controlling the flow of fluid to and from a power operator comprising:
   pumping means having a controlled displacement for delivering fluid to and from said operator at varying flow rates,
   means for controlling the displacement of said pump to vary the rate of flow of fluid to and from said operator, and
   means for maintaining a downstream pressure from said pumping means in excess of an upstream pressure when pumping fluid from said operator.

2. A system for controlling the flow of fluid to and from a power operator as set forth in claim 1 wherein said controlling means includes an electrically operated servo valve for varying the displacement of said pump.

3. A system for controlling the flow of fluid to and from a power operator as set forth in claim 2 wherein said pumping means includes a variable displacement pump having a piston-controlled yoke coupled to said servo valve.

4. A system for controlling the flow of fluid to and from a power operator comprising:
   pumping means having a controlled displacement for delivering fluid to and from said operator at varying flow rates,
   means for controlling the displacement of said pump to vary the rate of flow of fluid to and from said operator, and
   a relief valve connected to the downstream port of said pumping means when pumping fluid from said operator to maintain a preset pressure differential across said pump.

5. A system for controlling the flow of fluid to and from a power operator as set forth in claim 4 wherein said relief valve includes a controllable pressure setting for establishing the pressure drop across said pumping means.

6. A system for controlling the flow of fluid to and from a power operator as set forth in claim 5 including a line connecting the vent port of said relief valve to the operator side of said pumping means to establish the pressure differential to be maintained across said pump when pumping fluid from said operator.

7. A system for controlling the flow of fluid to and from a power operator as set forth in claim 6 including a check valve in said line for increasing the pressure differential established across said pump.

8. A system for controlling the flow of fluid to and from a power operator as set forth in claim 7 wherein said controlling means includes:
   an electrically operated servo valve for varying the displacement of said pumping means, and
   an adjustable signal source coupled to said servo valve for establishing the spool position thereof.

9. A system for controlling the flow of fluid to and from a power operator as set forth in claim 8 wherein said pumping means includes a variable displacement pump having a piston-controlled yoke coupled to said servo valve.

10. A system for controlling the raising and lowering speeds of a drillhead in a drilling rig, comprising:
    hydraulic operators for raising and lowering said drillhead at a speed determined by the amount of fluid pumped thereto,
    pumping means having a controlled displacement for pumping fluid to and from said hydraulic operators at varying flow rates,
    means for controlling the displacement of said pump to vary the rate of flow of fluid to and from said operators, and
    means for maintaining a downstream pressure from said pumping means in excess of an upstream pressure when pumping fluid from said operators.

11. A system for controlling the raising and lowering speeds of a drillhead as set forth in claim 10 wherein said pressure maintaining means includes a relief valve with a control couple between the output and input of said pumping means to maintain a predetermined differential pressure across said pumping means when pumping fluid from said hydraulic operators.

12. A system for controlling the raising and lowering speeds of a drillhead as set forth in claim 11 wherein said pressure maintaining means further includes means for varying the relief pressure of said relief valve in accordance with the upstream pressure of said pumping means when pumping fluid from said operators to thereby establish a fixed pressure differential across said pumping means with the downstream pressure in excess of the upstream pressure.

13. A system for controlling the raising and lowering speeds of a drillhead as set forth in claim 12 wherein said means for controlling the relief pressure of said relief valve includes a check valve connected between the vent line of said relief valve and the operator side of said pumping means.

14. A system for controlling the raising and lowering speeds of a drillhead as set forth in claim 13 wherein said pumping means includes a variable displacement pump having a piston-controlled yoke.

15. A system for controlling the raising and lowering speeds of a drillhead as set forth in claim 14 wherein said controlling means includes a servo valve coupled to the yoke of said variable displacement pump.

References Cited

UNITED STATES PATENTS

| | | |
|---|---|---|
| 2,227,814 | 1/1941 | Tyler. |
| 2,302,922 | 11/1942 | Tucker. |
| 2,977,765 | 4/1961 | Fillmore. |

EDGAR W. GEOGHEGAN, Primary Examiner